J. K. McDonald's Eye Glass.
74109
PATENTED
FEB 4 1868
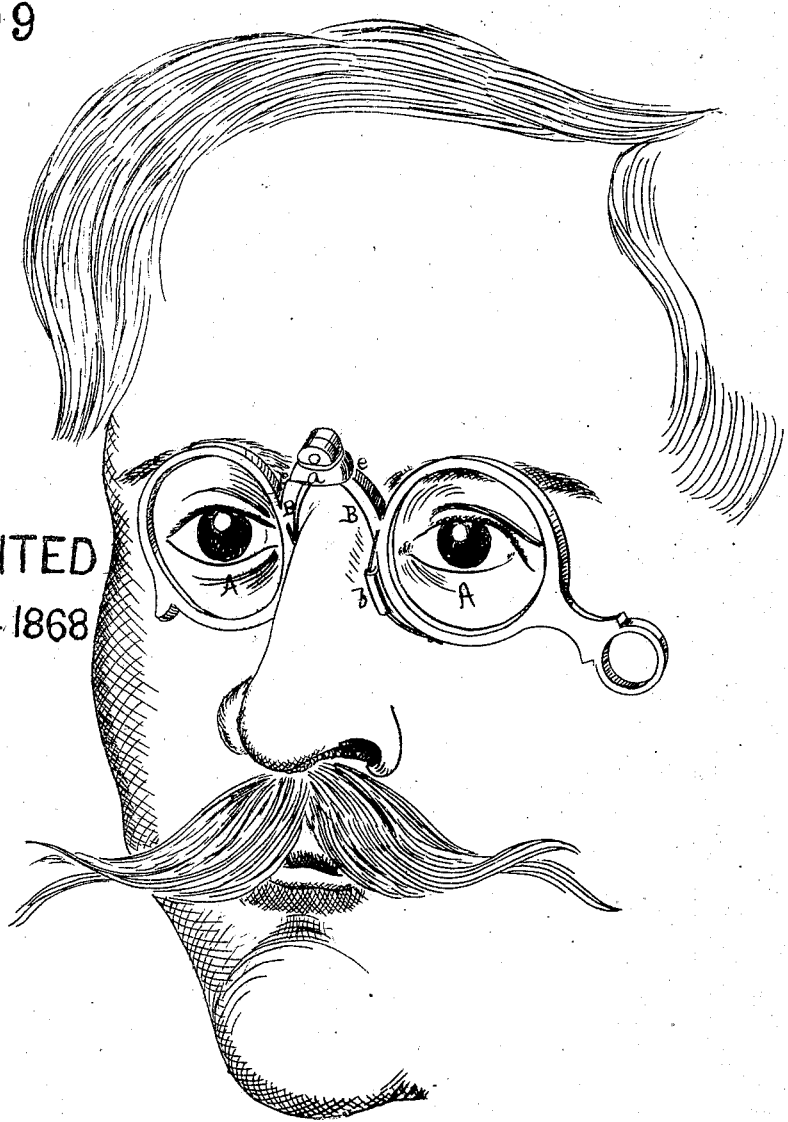
Witnesses,
Theo Tusche
Wm Spewm
Inventor:
J K McDonald
Per Munn & Co
Attorneys

United States Patent Office.

JOHN K. McDONALD, OF NEWARK, NEW JERSEY.

Letters Patent No. 74,109, dated February 4, 1868.

IMPROVEMENT IN EYE-GLASSES.

The Schedule referred to in these Letters Patent and making part of the same.

TO ALL WHOM IT MAY CONCERN:

Be it known that I, JOHN K. McDONALD, of Newark, in the county of Essex, and State of New Jersey, have invented a new and improved Eye-Glass; and I do hereby declare that the following is a full, clear, and exact description thereof, which will enable others skilled in the art to make and use the same, reference being had to the accompanying drawings, forming part of this specification.

The drawing exhibits my improved eye-glasses and their manner of action, when employed in the usual way.

This invention relates to an improved method of providing the spring-tension to eye-glasses, with other devices perfecting the whole, and consists in connecting the glasses by jointed arch-pieces, which are clasped by a soft rubber band, together with nose-pieces formed of the same material or other elastic composition, as will be hereinafter more fully set forth.

In the drawings, A A are the glasses held in rims of horn, hard rubber, or other material, the said rims having extensions, B, which are jointed together with a hinge-joint, as shown, and constitute the arch or arch-pieces connecting the glasses. An elastic rubber band, $a$, is set in notches $e$ in the arch-pieces, as shown, which are provided for its reception. The contractile force of this rubber band is exerted to clamp the glasses on the nose or to hold them closed when not on the nose. Nose-pieces $b$, formed of soft rubber tubing, are held to the rims by steel wire or spring, which have their ends sprung into notches on the rims, or they may be fastened in any other suitable manner. Any elastic composition may be substituted for soft rubber, and either material may be fastened to the wire by cementation or otherwise. The tubing may be substituted for rubber pads fastened to the rims of the glasses, thus dispensing with the wire, though I think that method of securing the rubber the best. The contractile action of the rubber band $a$ provides a steady but not unpleasant pressure. The nose-pieces being soft and elastic, hold firmly, without causing to the wearer an unpleasant sense of pinching, which is the case with the hard nose-pieces heretofore used. It is cheap, durable, and not likely to get out of repair, and, if broken or out of repair, can be cheaply and easily repaired by any person of ordinary ingenuity.

I am aware that various forms of nose-pieces have been used on eye-glasses, as also many forms of steel springs for clamping the same upon the nose, but the nose-pieces are of hard rubber or other hard material, and the springs, of steel wire. I therefore do not claim broadly nose-pieces attached to the spring or eye-glass, or a spring action for said glasses, but

What I claim as my invention, and desire to secure by Letters Patent, is—

The nose-piece below the extensions B, when formed of soft rubber tubing upon the spring wire, fitted in notches in the rims, as herein shown and described.

JOHN K. McDONALD.

Witnesses:
WM. F. McNAMARA,
J. A. FRASER.